United States Patent
Puthiyandyil et al.

(10) Patent No.: US 7,305,489 B2
(45) Date of Patent: Dec. 4, 2007

(54) METHOD AND APPARATUS FOR AGGREGATE NETWORK ADDRESS ROUTES

(75) Inventors: Sanil Kumar Puthiyandyil, Lawrence, MA (US); Shaji Radhakrishnan, Mt. Prospect, IL (US); Rajesh Ramankutty, Mt. Prospect, IL (US); Krishnamoney Elayathu, Vernon Hills, IL (US)

(73) Assignee: UTStarcom, Inc., Alameda, CA (US)

( * ) Notice: Subject to any disclaimer, the term of this patent is extended or adjusted under 35 U.S.C. 154(b) by 847 days.

(21) Appl. No.: 10/356,038

(22) Filed: Jan. 30, 2003

(65) Prior Publication Data
US 2003/0154307 A1    Aug. 14, 2003

Related U.S. Application Data

(60) Provisional application No. 60/353,710, filed on Jan. 31, 2002.

(51) Int. Cl.
*G06F 15/16* (2006.01)
(52) U.S. Cl. .................................... 709/245
(58) Field of Classification Search ................. 709/244
See application file for complete search history.

(56) References Cited

U.S. PATENT DOCUMENTS 6,377,997 B1 * 4/2002 Hayden .................... 709/231
6,751,191 B1 * 6/2004 Kanekar et al. ........... 370/217
6,792,474 B1 * 9/2004 Hopprich et al. .......... 709/245
2002/0038380 A1 * 3/2002 Brawn et al. .............. 709/238

OTHER PUBLICATIONS

3Com Corporation—"*The Total Control® 1000 Multiservice Access Platform*", Apr. 2000.
Information Sciences Institute, University of Southern California—"*RFC: 791, Internet Protocol DARPA Internet Program Protocol Specification*", Sep. 1981.

* cited by examiner

*Primary Examiner*—Jason Cardone
*Assistant Examiner*—Minh-Chau Nguyen
(74) *Attorney, Agent, or Firm*—McDonnell Boehnen Hulbert & Berghoff LLP

(57) ABSTRACT

A method for allocating network addresses comprises providing an address pool comprising a plurality of network addresses and then dividing the address pool into a plurality of address sub-pool that comprise a unique subset of the network addresses of the address pool. Each of the sub-pools is available for use by any one of a plurality of routing devices of a network access server. The method then comprises receiving a request to assign a first network address to a first user, allocating a first address sub-pool of the plurality of address sub-pools to a first routing device of the plurality of routing devices and transmitting a first message to the other routing devices to indicate that the first address sub-pool has been allocated. The method additionally comprises assigning the first network address to the first user from the first address sub-pool and advertising an aggregate route for the first address sub-pool over a network.

26 Claims, 6 Drawing Sheets

METHOD AND APPARATUS FOR AGGREGATE NETWORK ADDRESS ROUTES

PRIORITY AND RELATED APPLICATIONS

The present patent application claims priority under 35 U.S.C. §119(e) to U.S. Provisional Patent Application Ser. No. 60/353,710; filed on Jan. 31, 2002, the full disclosure of which is incorporated herein by reference.

BACKGROUND OF THE INVENTION

1. Field of the Invention

The present invention relates generally to computing networks and, more particularly, to network address route aggregation.

2. Description of Related Art

Computing networks have developed into a resource that is employed for business, education, entertainment and recreation. Network implementations, of course, are numerous in variation and a particular configuration may depend on the specific purpose, or purposes the network is intended to serve. However, one common aspect of most computing networks is the use of network addresses. These network addresses are used to identify individual elements that are coupled with a given computer network.

One commonly known type of network addresses are Internet Protocol (IP) addresses. Such IP addresses, as just indicated, are used to identify computers, and other devices, (collectively "network devices") that are coupled with the Internet. In this respect, IP addresses are analogous to phone numbers. Thus, an exemplary network device that is coupled with the Internet preferably has a unique IP address so that other network devices can "call" or communicate with the exemplary network device. If IP addresses were not unique, data (such as email messages or media streams) sent to a non-unique IP address would potentially be delivered to multiple networks devices, which is typically not a desirable result.

Network devices coupled with the Internet may make their IP address known to other network devices by advertising (broadcasting) a route on the Internet. Such advertisements provide information on how to contact a specific network device via the Internet using IP communication (e.g., packet switched network techniques). However, if each individual network device on the Internet were to advertise its route, those routes may flood certain parts of the Internet. Consequently, such an approach may adversely affect the performance of those networks.

One technique that has been employed to address this concern is the use of route aggregation. In this context, route aggregation may be used to advertise a single route for multiple IP addresses. In this regard, a network access server (also referred to as a remote access server or concentrator) may be used. Such a network access server (NAS) may correspond with a set (pool) of IP addresses, which are typically sequential IP addresses. As is known, IP addresses are 32 bits (binary), separated into four eight-bit fields. These IP addresses are typically presented in decimal fashion, such as, for example, 10.0.2.100. Thus, the next (sequential) IP address for an IP address pool containing this example address would be 10.0.2.101.

In current approaches, a NAS may comprise a plurality of routing devices, such as hardware routers. The NAS may also have a pool of IP addresses that it manages and assigns to users that contact the NAS (such as via a modem (wireless or phone line) or a packet network). As a result of the NAS assigning an IP address to a user, that user may access the Internet (or another appropriate network, such as a virtual private network) via a gateway included in the NAS. The NAS also advertises route information for the IP addresses it assigns to users. This route advertisement may be done in non-aggregated or aggregated fashion. However, for purposes of this remainder of this disclosure, only aggregate routes will be discussed.

Using current techniques, each of the plural routers is associated with a mutually exclusive subset of IP addresses from the total pool of IP addresses managed by the NAS. However, such an approach has certain disadvantages. For example, if one (or more) of the routing devices in the NAS assigns all of its (their) corresponding subset(s) of IP addresses, further requests made to that (those) routing device(s) will be declined. Another disadvantage of current approaches results from the fact that the number of routing devices typically determines the IP address subset size. Typically, each routing device controls (has a subset with) an equal number of IP addresses as the other routing devices to attempt to balance the "load" across the routing devices. However, this approach may lead to IP addresses being wasted (e.g. not available for use).

In this regard, if a routing device in the NAS fails, all the IP addresses associated with that routing device would be wasted, or unavailable for assignment to users. As another example, if one or more of the routing devices in a NAS are under-loaded (e.g., do not receive a proportionate number of requests for IP addresses as the other routing devices in the NAS), a disproportionate number of the IP addresses associated with the under-loaded routing device(s) may be "wasted." Therefore, based on the foregoing, alterative methods for aggregate address routing are desirable.

SUMMARY OF THE INVENTION

In a first aspect, an exemplary a method for allocating network addresses using a network access server (NAS) in accordance with an embodiment of the invention comprises providing a pool of network addresses, such as Internet Protocol (IP) addresses. Such a NAS may be a server that is operated by an Internet Server Provider (ISP), such as America Online, for example. Such a NAS may provide access to the Internet for customers of the ISP. The method then comprises dividing the address pool into a plurality of address sub-pools, where each of the sub-pools comprises a unique subset of the network addresses of the address pool. Each of theses sub-pools is then available for use by any one of a plurality of routing devices in the network access server.

For the exemplary method, the NAS then receives a request to assign a first network address to a first user, which may be received via a phone line, network connection or any other suitable communication means, such as via a mobile switching center for wireless network devices, for example. A first address sub-pool is then allocated to a first routing device of the plurality of routing devices and a message is transmitted (e.g., from the first routing device) to the other routing devices, where the message indicates that the first sub-pool is allocated to the first routing device. This message may, for example, be transmitted using a broadcast message communicated via an internal bus in the NAS, though other techniques exist. A network address (e.g., IP address) is then assigned to the user from the first address sub-pool. The first routing device then advertises an aggregate route for the first sub-pool over the network, in this case the Internet.

In another aspect of the invention, the exemplary method further comprises receiving a second request to assign a second network address to a second user and then allocating a second address sub-pool to a second routing device. A message is then transmitted to the other routing devices to indicate that the second address sub-pool has been allocated to the second routing device. For this situation, the second routing device for any number of reasons may handle the request for a network address from the second user. For example, the second user may have contacted the NAS using a different telephone access number than the first user. For this situation, a network address is then assigned to the second user (e.g., the second user's network device) from the second address sub-pool. The method then comprises advertising an aggregate route for the second sub-pool over the network.

In still a further aspect of the invention, an exemplary method further comprises receiving another request to assign a third network address to a third user and assigning the third network address to the third user from the second address sub-pool. Alternatively, the third network address could be assigned to the third user from the first sub-pool or from a third sub-pool that is allocated to a third routing device, or any other routing device in the NAS, including the first or second routing device.

The exemplary method additionally comprises unassigning the first network address from the first user and unallocating the first address sub-pool from the first routing device. The method then comprises transmitting a message (such as using a broadcast message) to the other routing devices to indicate that the first address sub-pool is no longer allocated (e.g., the first sub-pool is free to be allocated to any routing device in the NAS).

In still yet another aspect of the invention, an exemplary platform (such as a NAS) for assigning network addresses to a plurality of users comprises a plurality of routing devices; and memory having a set of instructions. When executed by the platform, the instructions provide for implementing methods in accordance with exemplary embodiments of the invention, such as those just described.

BRIEF DESCRIPTION OF THE DRAWINGS

The following detailed description makes reference to the appended drawings, in which.

DETAILED DESCRIPTION OF PREFERRED EMBODIMENTS OF THE INVENTION

Overview and Exemplary Network Configuration

Figure 1:
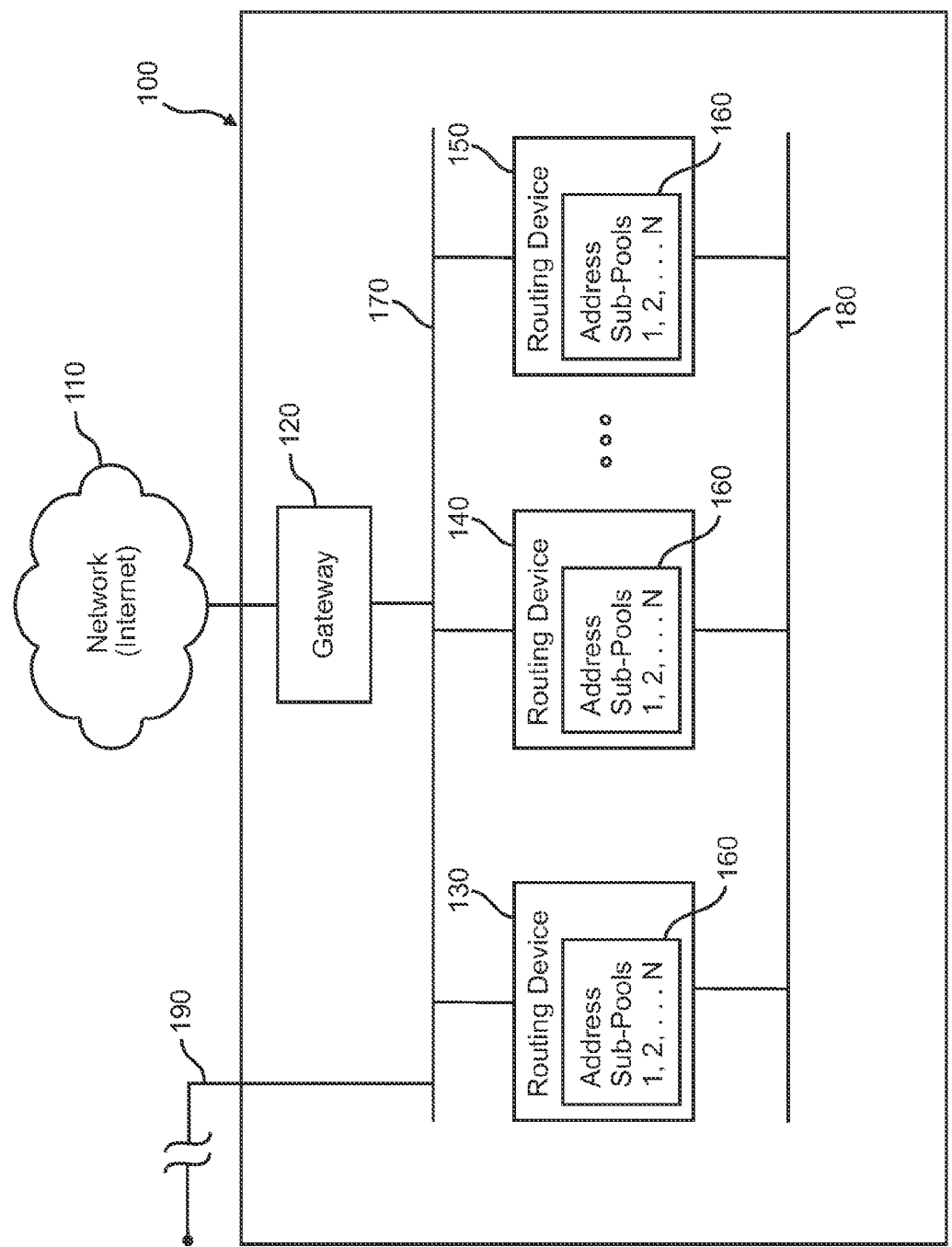
FIG. 1 is a schematic diagram illustrating a network configuration in which embodiments in accordance with the invention may be employed.

Referring now to FIG. 1, an exemplary network configuration is illustrated that employs a network access server (NAS) 100 in accordance with an embodiment of the invention. The exemplary network configuration shown in FIG. 1 may also be used to implement methods for assigning network addresses in accordance with embodiments of the invention. It will be appreciated that the configuration shown in FIG. 1 is merely exemplary and that the specific configuration is not important. While FIG. 1 illustrates the NAS 100 providing access to a network 110 (denoted the Internet), many other possibilities exist. For example, the NAS 100 may provide access to a local area network (LAN) or a virtual private network (VPN). As yet another alternative, the NAS 100 may act as a bridge between two networks, such as a VPN and the Internet. Of course, still other configurations are possible.

For the particular configuration shown in FIG. 1, the NAS 100 includes a gateway 120. The gateway 120 may be a network interface card coupled with the network 110 or may be an interface coupled directly to the Internet. Again, the specific implementation details of the gateway 120 are not critical.

The NAS 100 further includes routing devices 130, 140 and 150. Each of the routing devices 130-150 comprises address sub-pool parameters 160, which will be discussed in further detail hereinafter. Briefly, however, the availability of the sub-pools for allocation to any of routing devices 130-150 may reduce the amount of IP address waste of prior approaches. In this regard, the network address (e.g., IP address) sub-pools may be sized so as to more precisely distribute network "load", as each routing device may have plural IP address sub-pools dynamically allocated to it when needed. Therefore, trading off route aggregation, network flooding and load balancing may be accomplished in a more precise manner than prior approaches, where a single pool is statically assigned to each routing device.

As is shown in FIG. 1, the number of routing devices in the NAS 100 is not fixed. Alternatively to the three routing devices shown, the NAS 100 may comprise fewer (typically not less than two), or may comprise more routing devices. For the illustrated embodiment, the routing devices 130-150 are coupled with the gateway 120 via a bus 170, which may be termed a front-side bus in some embodiments. Routing devices 130-150 are further communicatively coupled via bus 180, which may be termed a backplane, or backside bus, in certain embodiments. Alternatively, routing devices 130-150 may communicate over any appropriate communication interface. As will be described in further detail below, bus 180 may be used to transmit messages between routing devices 130-150 regarding the allocation status of network address sub-pools.

For this embodiment, the routing devices 130-150 comprise hardware routers installed in respective slots (not specifically shown) in the NAS 100. As will be described further below, the respective slot in which a router is installed may determine that specific router's priority to use (have allocated to it) sub-pools of network (IP) addresses to assign to users. As one alternative, the routing devices 130-150 may comprise software routers. For such a configuration, the routing devices 130-150 each comprise a software process implementing a routing device. Each software process includes a "slot" designator so as to assign a priority for each software router to user the network address sub-pools for assigning network addresses to users.

In this regard, end users may communicate with the NAS 100 via interface 190. Interface 190 may take a variety of forms such as a modem interface, a packet network interface, among any other suitable technique for coupling network devices (not shown) with the NAS 100. Alternatively, the interface 190 may comprise plural interfaces, such as multiple modem and/or packet network interfaces. Again, the specific implementation details of interface 190 are not critical. Using the interface 190 and an appropriate network device, end users may request and be assigned a network address from one of the address sub-pools defined by sub-pool parameters 160. This process may be carried out using any one of the routing devices 130-150. Specifics of such a method will be discussed further below with reference to FIG. 2.

For the remainder of this disclosure, the exemplary methods and apparatus described herein will be discussed with reference to a NAS (such as the NAS 100) acting as an Internet access server that assigns IP addresses and broadcasts aggregate routes for those IP addresses. As was discussed above, such a NAS may be operated by an Internet Service Provider (ISP) to provide Internet access for network devices of customers of the ISP. It will be appreciated, of course, that many other configurations are possible. Alternatively, for example, as previously noted, the NAS 100 may act as an access server for a virtual private network (VPN) or a local area network (LAN), such as a private corporate network.

Address Pools and Address Sub-Pools

Figure 2:
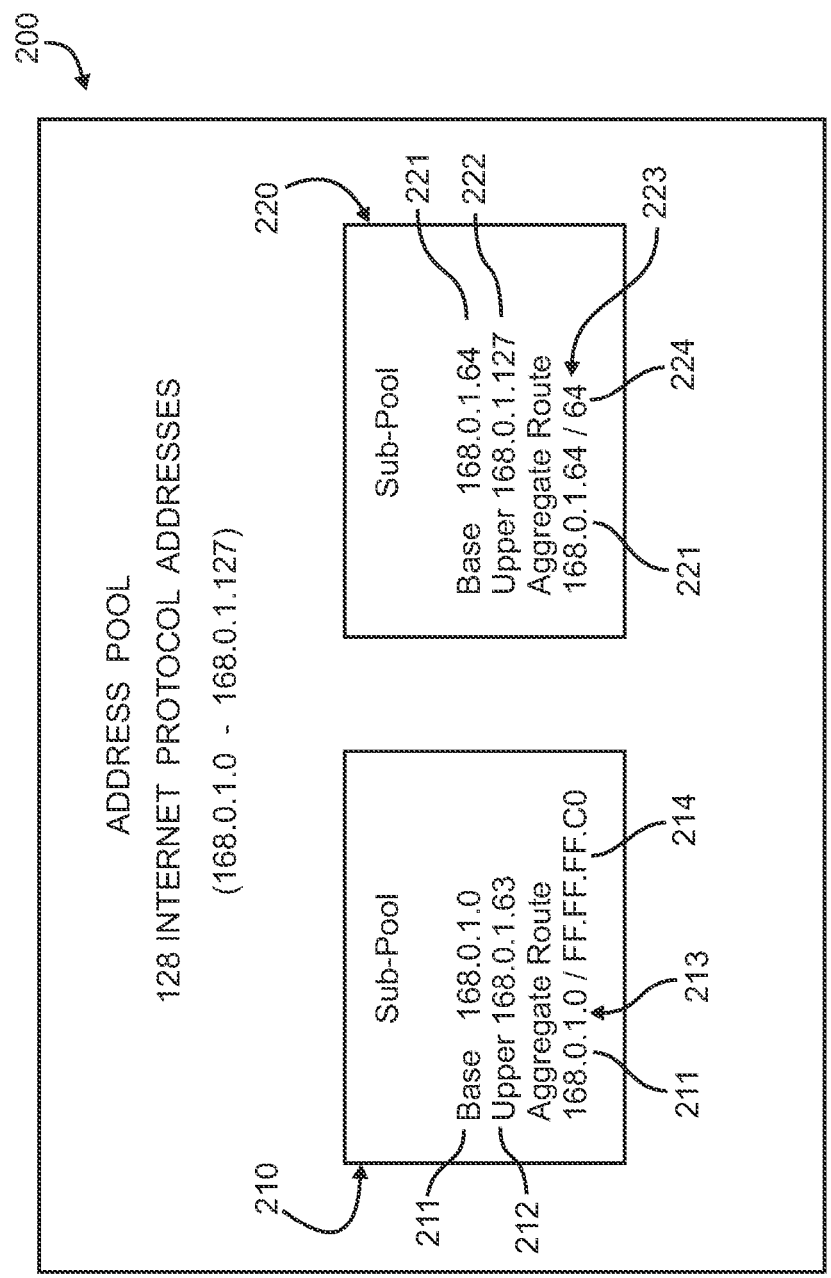
FIG. 2 is a chart schematically illustrating an Internet Protocol (IP) address pool and corresponding IP address sub-pools.

FIG. 2 is a chart that schematically illustrates an address pool 200. The address pool 200 comprises one hundred twenty eight (128) IP addresses that are divided into two sub-pools, 210 and 220, of sixty-four (64) IP addresses each. The IP addresses of IP pool 200 are sequential and range from 168.0.1.0 through 168.0.1.127. It will be appreciated that the IP pool 200 is merely illustrative, and actual implementations may vary. For example, smaller IP address sub-pools may be used, and/or a larger number of IP address may be included in IP pool 200. The sub-pools 210 and 220 each include respective base addresses, 211 and 311. As shown in FIG. 2, the base address 211 is 168.0.1.0, the first address of IP pool 200, and the base address 221 is 168.0.1.64, sixty-four sequential addresses higher than the base address 211. As is also shown in FIG. 2, the respective upper addresses 212 and 222 of sub-pools 210 and 220 are 168.0.1.63 and 168.0.1.127.

Also shown in FIG. 2 are two forms of an aggregate route, 213 and 214 that may be used to advertise the routes for the sub-pools 210 and 220. The aggregate route 213 comprises the base address 211 and an aggregate route mask 214. The aggregate route mask 214, when converted to binary, specifies which bits of the IP addresses included in the aggregate route are variable. The bits that convert to zero in binary are the variable bits. Thus, for this example, the last six bits are variable, which allows for sixty-four unique addresses starting with the base address 211. The aggregate route 223 comprises base address 221 and a pool size indicator 224, which for this example is defined as 64 (sixty-four). The result of advertising the aggregate routes on, for example, the Internet, using either example aggregate route form is that an aggregate route for an IP (network) address sub-pool is defined containing sixty-four IP addresses starting with the respective base address. It is noted that the form of the aggregate route 223 is typically more useful that the form of the aggregate route 213 in applications where the IP (network) address sub-pool sizes are irregular, or do not fall on binary boundaries.

Figure 3:
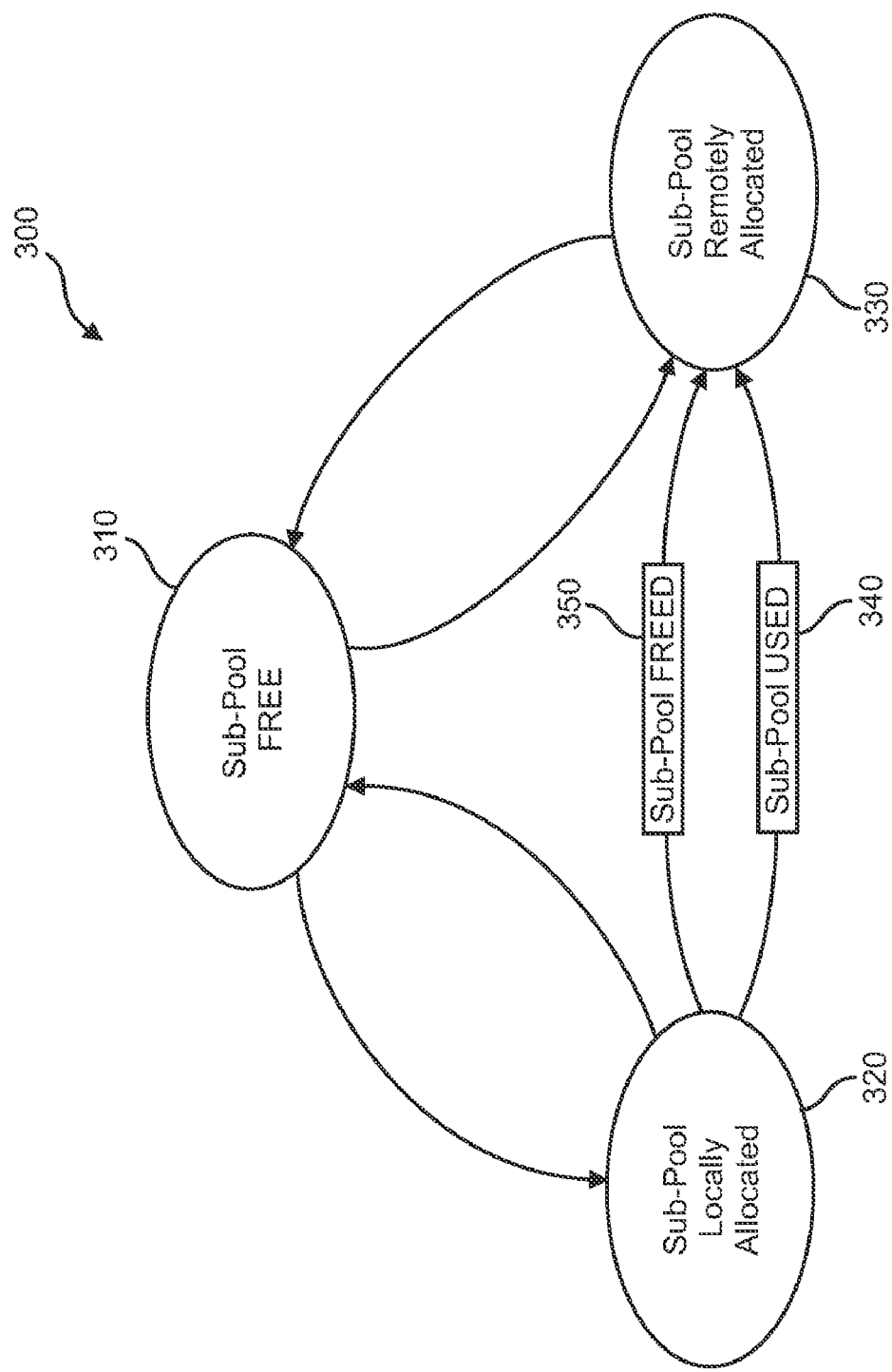
FIG. 3 is a flowchart illustrating methods in accordance with exemplary embodiments of the invention.

FIG. 3 is a state diagram 300 that illustrates, for an exemplary embodiment, the various states that may be associated with each network address sub-pool for each routing device of a NAS. In this regard, the state diagram 300 comprises a Sub-Pool FREE state 310, which indicates that that sub-pool is available to be allocated to a routing device. The state diagram 300 also comprises a Sub-Pool LOCALLY ALLOCATED state 320. The LOCALLY ALLOCATED state 320 indicates that that specific sub-pool is allocated to that specific routing device and, therefore, available network addresses of that sub-pool may be assigned to users by that routing device. The state diagram 300 also comprises a Sub-Pool REMOTELY ALLOCATED state 330, which indicates that that sub-pool is allocated to another routing device and network addresses from that sub-pool cannot be allocated by the routing device.

Looking at a single routing device and a single sub-pool, the sub-pool's "state" will transition from the Sub-Pool FREE 310 state to the Sub-Pool LOCALLY ALLOCATED state 320 when the sub-pool is allocated to the routing device, typically in response to a request for a network address, as has previously described. For the configuration shown in FIG. 1, the routing device then transmits a Sub-Pool USED message 340 to the other routing devices in the NAS to notify those other routing devices that the sub-pool has been allocated. The state of the sub-pool in the other routing devices would then be set to the Sub-Pool REMOTELY ALLOCATED state 330. Further, the state of the sub-pool for the routing device to which it is allocated will then transition from the Sub-Pool LOCALLY ALLOCATED state 320 to the Sub-Pool FREE state 310 when all of the network addresses of the sub-pool are no longer assigned. Also in this situation, the routing device then transmits a Sub-pool FREED message 350 to the other routing device in the NAS to notify the other routing devices that the sub-pool is again available to be allocated. The other routing devices then set the state of the sub-pool to the Sub-Pool FREE state 310.

While the invention is not limited in scope to any particular messaging approach, the routing devices of the NAS 100, shown in FIG. 1, may use the following broadcast message structure for communicating between them in the fashion described above. In this respect, the messages may be structured as follows:

Msg type (1 byte)—HARC_STATE_SYNC—This defines the type of message.
Response status (1 byte)—SUCCESS or FAILURE
Priority (1 byte)—a priority of the sending router card.
Number of TLVs (1 byte)—The number of TLVs (Type—Length—Value) present in this message.
Message ID (4 bytes)—a unique identifier to correlate request and response.
TLVs—an array of TLVs sent in this message.

Furthermore, the following TLVs are used in this message structure:
Type (1 byte): Sub-Pool-USED (1 byte).
Length (1 byte): 6 bytes.
Value (4 bytes): Beginning network address of the sub-pool.
Type (1 byte): Sub-Pool-FREED (1 byte).
Length (1 byte): 6 bytes.
Value (4 bytes): Beginning network address of the sub-pool.

This message structure is, of course, exemplary and other message structures may be used. Additionally message may be communicated by techniques other than broadcast messages, such as by using point-to-point messaging, for example.

Exemplary Methods for Allocating Network Addresses

FIG. 4 illustrates exemplary methods for allocating network addresses in accordance with embodiments of the invention. While these methods are discussed in detail below, briefly, FIG. 4A illustrates a method for assigning a network address to a user and advertising an aggregate route that includes that address. FIG. 4B, illustrates a method for removing the address assignment of FIG. 4A. FIG. 4C illustrates a method for managing the occurrence of one address sub-pool being allocated to multiple routing devices, which may occur due to a delay between the allocation to one routing device and notification of that allocation to the other routing devices. FIG. 4D illustrates a method for assigning network addresses to additional users and FIG. 4E illustrates a method for assigning a second address sub-pool to a routing device that already has a first address pool allocated to it.

Figure 4A:
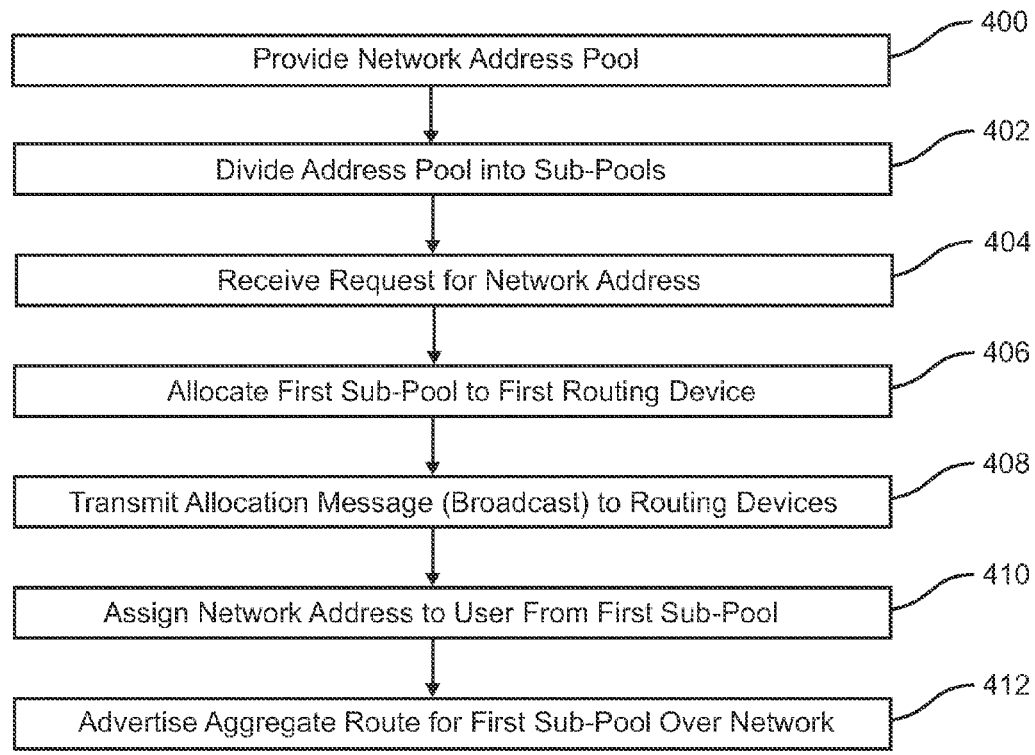
FIGS. 4A-4E are flow charts of exemplary methods for allocating network addresses in accordance with embodiments of the invention.

Referring now in more detail to FIG. 4A, a method for assigning network addresses comprises providing an address pool comprising a plurality of network addresses at block 400. Because, as was previously described, such network addresses are preferably unique, in the case of IP addresses, a central administrative authority, the Internet Network Information Center (NIC), which is known to those working in this area, assigns blocks of IP addresses to ensure duplicate addresses are not created. The entity acquiring such address blocks then assigns (preferably sequential) IP addresses within the assigned block of IP addresses. These addresses may then be used as an IP address pool, such as address pool 200. While this discussion is generally related to the Internet and the use of IP addresses, it will be appreciated that invention is not limited in these respects. For example, the network addresses of the network address pool may, not be sequential, or may be VPN addresses, or LAN addresses, as has been previously described.

At block 402, the network address (IP address) pool is then divided into a plurality of network address sub-pools. Each of the sub-pools comprises a unique subset of network addresses of the network address pool. In comparison to prior approaches where sub-pools were exclusive with respect to the routing devices to which they were allocated, the sub-pools of the exemplary method are each available for use by any one of a plurality of routing devices included in a NAS, as is be described further below.

Depending on the particular embodiment, each subset (sub-pool) of network addresses may comprise an equal number of network addresses, or the number of network addresses in each sub-pool may vary. As was described with reference to FIG. 2, various forms of aggregate routes may be used to advertise those routes to the Internet for the sub-pools. The form of the aggregate routes, as was indicated, may depend on the particular grouping of network addresses for the sub-pools.

The method shown in FIG. 4A then comprises at, block 404, receiving a request to assign a first network address to a first user. Such a request may be received in a number of ways. For, example a NAS that is being used for dial-up users to access, for example, the Internet, such a request may be received as part of dial up login sequence. Alternatively, the request may be part of a network login sequence, such as the user logging into a LAN or VPN.

In response to receiving a request for a network address at block 404, one of the network address sub-pools is allocated to a routing device of the plurality of routing devices at block 406. For certain embodiments, there may be a preference in the order of allocation of the sub-pools. For example, the routing devices that have lower priorities to use the network address sub-pools may prefer the sub-pools with lower sequence network addresses, leaving the sub-pools with higher sequence network addresses for allocation at a later time. This may avoid potential network address sub-pools conflicts, as the routing devices may default to different network address sub-pools when allocating those sub-pools to the routing devices. For this example, given the relevant sub-pools are not already allocated to a routing device, such an approach reduces the effects of allocation conflicts by preventing the same sub-pool from being assigned to two routing devices at the same time.

At block 408, a message is transmitted to the other routing devices to indicate that the address sub-pool has been allocated. The other routing devices then mark that sub-pool as remotely allocated, which indicates that they should not allocate that sub-pool for use in assigning network addresses to users. In this context, marking means, for example, flagging in software, or setting a bit in hardware to indicate a specific state, such as a remotely allocated network address sub-pool. In a similar respect, the routing device to which the sub-pool is assigned marks the sub-pool as being locally allocated, indicating that available network addresses from the sub-pool may be assigned to users. The message transmitted at block 408 may take a variety of forms. For example, it may be a standard network management protocol (SNMP) message, or it may be a broadcast message transmitted from one routing device to the other routing devices via a backplane and/or a bus of the NAS.

The method of FIG. 4A, at block 410, further includes assigning a network address to a first user from the locally allocated network address sub-pool. The network addresses may be assigned in a number of ways. For example, the lowest sequential network address available may be assigned. Of course other approaches may be employed, such randomly assigning network addresses, and the invention is limited in scope to any particular technique.

At 412, the method illustrated in FIG. 4A further comprises advertising an aggregate route for the first address sub-pool over a network, such as the Internet. This aggregate route may take the form of the aggregate routes discussed with reference to FIG. 2 or, alternatively, another approach may be employed. In this respect, the aggregate route includes a base network address for the sub-pool and one of an aggregate route mask, or a sub-pool size, either of which defines a sequentially last address of the first address sub-pool and, in turn, defines the number of sequential network addresses in the sub-pool. This aggregate route is then advertised on the Internet to provide routing information for the end user (network device) to whom the network address was assigned.

Figure 4B:
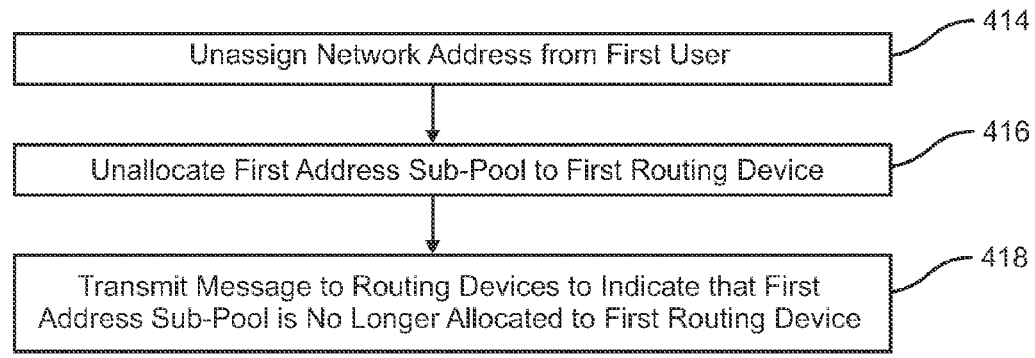

Referring now to FIG. 4B, the method shown in FIG. 4A may further comprise, at block 414, unassigning the network address that was assigned to the user. The network address may be unassigned because the user terminated the connection voluntarily, executed a log off sequence, among numerous other possibilities. Then, assuming no other network addresses of the sub-pool allocated to that routing device are in use (assigned), at block 416, the network address sub-pool is unallocated from the routing device. Then, at block 418, a message is transmitted to indicate that the sub-pool is no longer allocated and is again available for allocation. In this respect, the sub-pool will be marked as "free" (available for allocation) in all routing devices of the NAS.

Figure 4C:
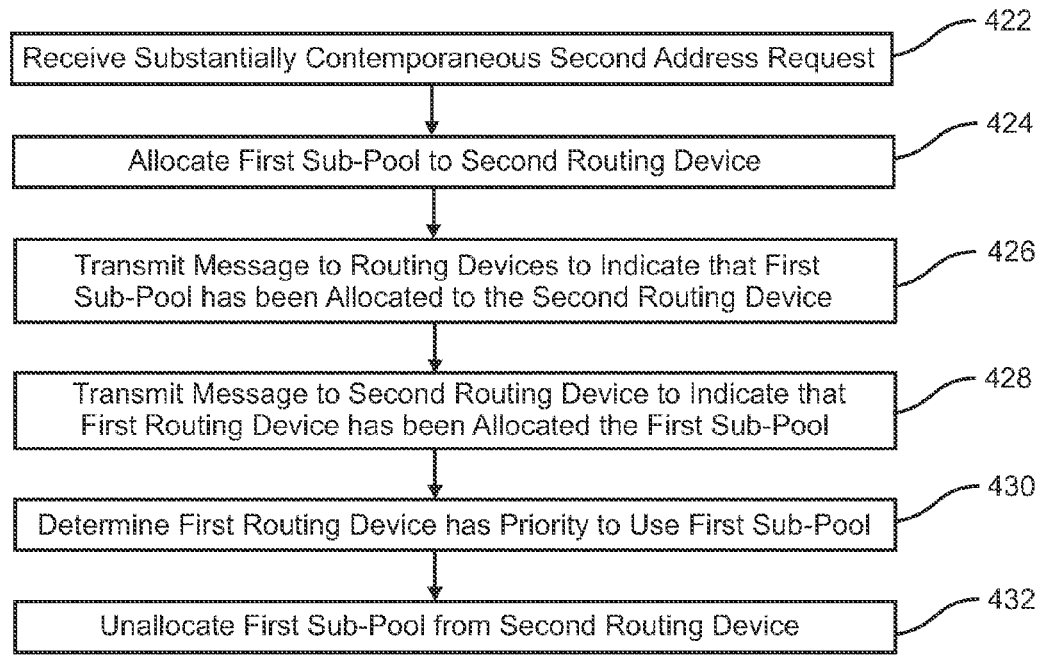

FIG. 4C illustrates that the method show in FIG. 4A may also further comprise receiving a second request to assign a network address to a user at 422 (which flows from 404 in FIG. 4A). This second request is substantially contemporaneously with the first request shown in FIG. 4A. Because the second routing device has not yet received the message transmitted at block 408 of FIG. 4A, the same network address sub-pool is allocated to the second routing device at block 424. The second routing device, at block 426, then transmits a message to the other router devices, indicating that it has been allocated the (first) network address sub-pool At block 428, in response to the message transmitted at block 426, the first routing device to which the sub-pool was allocated may then transmit a message to the second routing device to indicate that it (the first routing device) has also been allocated the first sub-pool and that the first routing device has priority to use the first sub-pool over the second routing device. The network address sub-pool, at 432, may then be unallocated from the second routing device, with any network addresses assigned by the second routing device being unassigned and the sub-pool being marked as remotely allocated in the second routing device.

Figure 4D:
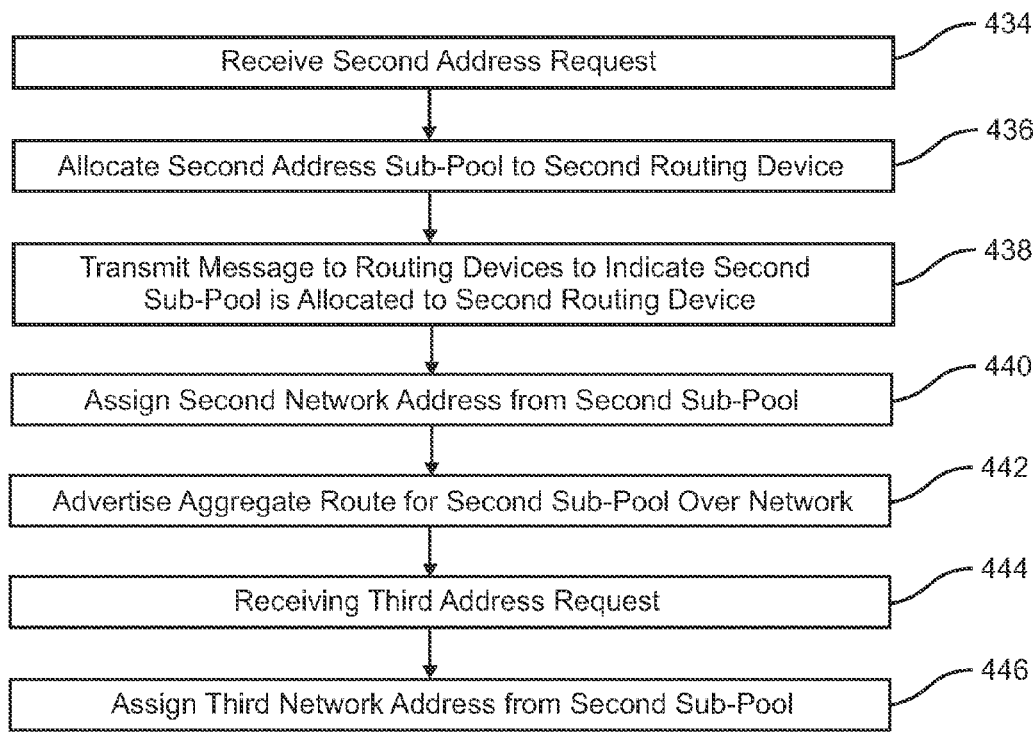

FIG. 4D illustrates that the method of FIG. 4A may further comprise assigning additional network addresses to other users in a similar fashion as was just described with respect to FIG. 4A. Therefore, for the sake of brevity, the elements of FIG. 4D will not be discussed in detail here.

Briefly, at block 434, a second request to assign a second network address to a second user is received. At block 436, a second network address sub-pool is then allocated to a second routing device and, at 438, a message is transmitted to the plurality of routing devices to indicate that the second address sub-pool has been allocated to the second routing device. The second network address is then assigned at block 440, and an aggregate route for the second address sub-pool is advertised over the network (e.g., the Internet) at 442. A third request to assign a network address to a third user is then received at block 444 and a third network address is assigned from the second network address sub-pool at block 446.

Figure 4E:
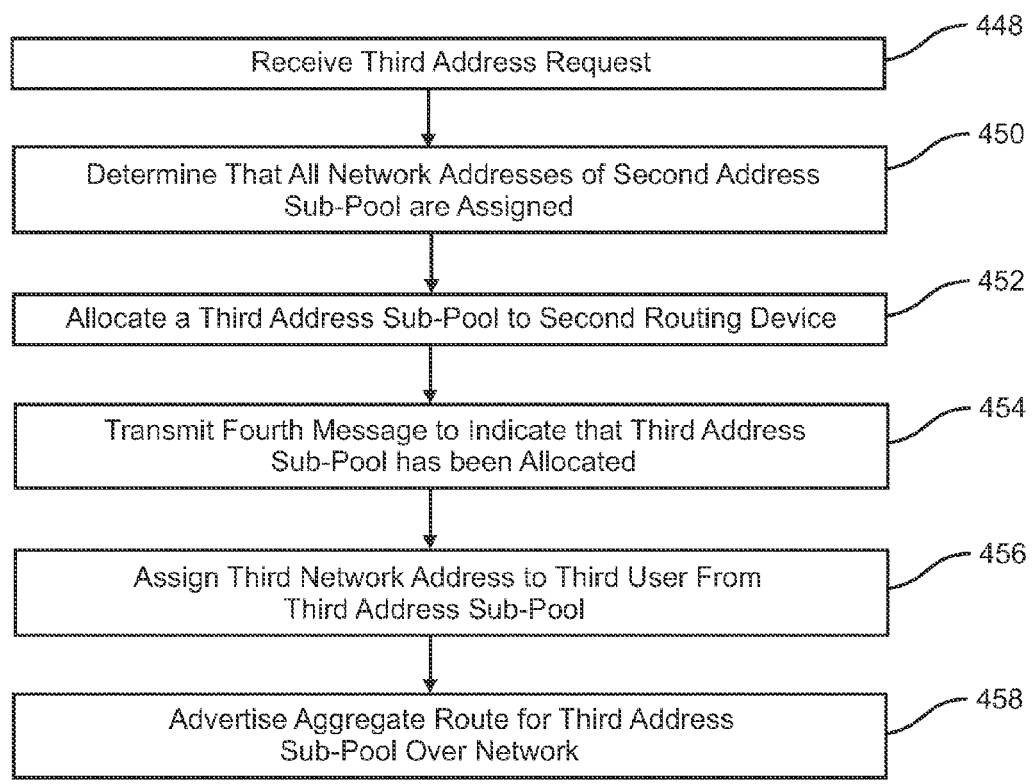

FIG. 4E illustrates that the method of FIG. 4A may further comprise allocating additional network address sub-pools to a routing device which already has one or more sub-pools allocated to it. Again, the specific details are not discussed here, as they are similar with previously discussed aspects of the embodiments discussed herein.

In this respect, at block 448, a third request to assign a third network address to a third user is received. At block 450, it is determined that all network addresses of the second address sub-pool have been assigned to other users. Thus, a third address sub-pool is allocated to the second routing device at 452. At block 454, a message is transmitted to the plurality of routing devices to indicate that the third address sub-pool has been allocated to the second routing device. The third network address is assigned to the third user from the third address sub-pool at 456, and an aggregate route for the third network address sub-pool is advertised over the network (e.g. the Internet) at block 458.

CONCLUSION

Persons skilled in the art will appreciate that variations from the illustrated embodiments can be made without departure from the spirit and scope of the invention. This true spirit and scope will be found by reference to the appended claims.

What is claimed is:

1. In a network access server, a method for allocating network addresses comprising: providing an address pool comprising a plurality of network addresses; dividing the address pool into a plurality of address sub-pools, each of the sub-pools comprising a unique subset of the network addresses of the address pool, wherein each of the sub-pools is available for use by any one of a plurality of routing devices of the network access server; receiving a request to assign a first network address to a first user; allocating a first address sub-pool of the plurality of address sub-pools to a first routing device of the plurality of routing devices; transmitting a first message to the other routing devices of the plurality of routing devices to indicate that the first address sub-pool has been allocated to the first routing device; assigning the first network address to the first user from the first address sub-pool; and advertising an aggregate route for the first address sub-pool over a network.

2. The method of claim 1, wherein the plurality of routing devices comprises a plurality of hardware routers installed in respective slots in the network access server.

3. The method of claim 2, wherein each of the hardware routers is assigned a respective priority for using the sub-pools of network addresses, the respective priorities being based on the respective slots in which each router is installed.

4. The method of claim 3, wherein the plurality of the address sub-pools are allocated to the plurality of routing devices based on their respective priorities.

5. The method of claim 1, wherein the network addresses of the address pool comprise sequential network addresses.

6. The method of claim 1, wherein the unique network addresses comprise Internet Protocol (IP) addresses.

7. The method of claim 1, wherein the unique network addresses comprise addresses of a local area network.

8. The method of claim 1, wherein the unique network addresses comprise addresses of a virtual private network.

9. The method of claim 1, wherein each subset of network addresses of the sub-pools comprises an equal number of network addresses.

10. The method of claim 1, wherein the plurality of routing devices comprises a plurality of software processes, each software process implementing a routing device and having a respective priority for using the sub-pools of network addresses.

11. The method of claim 1, wherein receiving a request to assign the first network address to the first user comprises receiving a dial-in request from the first user.

12. The method of claim 1, wherein receiving a request to assign the first network address to the first user comprises receiving a network request from the first user.

13. The method of claim 1, wherein transmitting a message to the plurality of routing devices comprises transmitting a broadcast message via a bus of the network access server.

14. The method of claim 1, wherein transmitting the message to the plurality of routing devices comprises transmitting the first message from the first routing device to the other routing devices.

15. The method of claim 1, wherein assigning the first network address to the first user from the first address sub-pool comprises assigning a sequentially lowest available network address of the sub-pool.

16. The method of claim 1, wherein the aggregate route for the first address sub-pool comprises a base network address for the first address sub-pool and an aggregate route mask that defines a sequentially last address of the first address sub-pool and, in turn, defines a number of sequential network addresses in the first address sub-pool.

17. The method of claim 1, wherein the aggregate route for the first address sub-pool comprises a base network address for the first address sub-pool and a sub-pool size that indicates a number of sequential network addresses in the first address sub-pool.

18. The method of claim 1, wherein the network comprises the Internet.

19. The method of claim 1, further comprising: receiving, substantially contemporaneously with the first request, a second request to assign a second network address to a second user; allocating the first address sub-pool of the plurality of address sub-pools to a second routing device of the plurality of routing devices; transmitting a second message to the plurality of routing devices to indicate that the first address sub-pool has been allocated to the second routing device; transmitting a third message to the second routing device to indicate that the first routing device has also been allocated the first sub-pool and that the first routing device has priority to use the first sub-pool over the second routing device; and unallocating the first sub-pool from the second routing device.

20. A platform for assigning network addresses to users comprising: a plurality of routing devices; and memory having a set of instructions, wherein the instructions provide for: receiving a first request to assign a first network address to a first user; allocating a first address sub-pool of a plurality of address sub-pools to a first routing device of the plurality of routing devices, wherein each address sub-pool of the plurality of address sub-pools comprises a unique set of network addresses; transmitting a first message to the plurality of routing devices to indicate that the first address sub-pool has been allocated to the first routing device; assigning the first network address to the first user from the first address sub-pool; and advertising an aggregate route for the first address sub-pool over a network.

21. The platform of claim 20, wherein the routing devices comprise hardware routers.

22. The platform of claim 20, wherein the routing devices comprise software routers.

23. The platform of claim 20, wherein the instructions further provide for: receiving a second request to assign a second network address to a second user; allocating a second address sub-pool to a second routing device; transmitting a second message to the plurality of routing devices to indicate that the second address sub-pool has been allocated to the second routing device; assigning the second network address to the second user from the second address sub-pool; and advertising an aggregate route for the second address sub-pool over the network.

24. The platform of claim 20, wherein the instructions further provide for: unassigning the first network address from the first user; unallocating the first address sub-poffol from the first routing device; and transmitting a second message to the plurality of routing devices to indicate that the first address sub-pool is no longer allocated to the first routing device.

25. A method for allocating network addresses comprising: providing an address pool comprising a plurality of network addresses; dividing the address pool into a plurality of address sub-pools, each of the sub-pools comprising a unique subset of the network addresses of the address pool, wherein each of the sub-pools is available for use by any one of a plurality of routing devices of the network access server; receiving a first request to assign a first network address to a first user; allocating a first address sub-pool of the plurality of address sub-pools to a first routing device of the plurality of routing devices; transmitting a first message to the plurality of routing devices to indicate that the first address sub-pool has been allocated to the first routing device; assigning the first network address to the first user from the first address sub-pool; advertising an aggregate route for the first address sub-pool over a network; receiving a second request to assign a second network address to a second user; allocating a second address sub-pool to a second routing device; transmitting a second message to the plurality of routing devices to indicate that the second address sub-pool has been allocated to the second routing device; assigning the second network address to the second user from the second address sub-pool; advertising an aggregate route for the second address sub-pool over the network; receiving a third request to assign a third network address to a third user; assigning the third network address to the third user from the second address sub-pool; unassigning the first network address from the first user; unallocating the first address sub-pool from the first routing device; and transmitting a third message to the plurality of routing devices to indicate that the first address sub-pool is no longer allocated to the first routing device.

26. The method of claim 25, further comprising: receiving a third request to assign a third network address to a third user; determining that all network addresses of the second address sub-pool have been assigned; allocating a third address sub-pool to the second routing device; transmitting a fourth message to the plurality of routing devices to indicate that the third address sub-pool has been allocated to the second routing device; assigning the third network address to the third user from the third address sub-pool; advertising an aggregate route for the third address sub-pool over the network.

* * * * *